United States Patent
Asoma

(10) Patent No.: US 7,916,209 B2
(45) Date of Patent: Mar. 29, 2011

(54) IMAGE CAPTURING APPARATUS, LIGHT METERING METHOD, LUMINANCE CALCULATION METHOD, AND PROGRAM

(75) Inventor: Akira Asoma, Kanagawa (JP)

(73) Assignee: Sony Corporation, Tokyo (JP)

( * ) Notice: Subject to any disclaimer, the term of this patent is extended or adjusted under 35 U.S.C. 154(b) by 427 days.

(21) Appl. No.: 12/042,746

(22) Filed: Mar. 5, 2008

(65) Prior Publication Data

US 2008/0231728 A1 Sep. 25, 2008

(30) Foreign Application Priority Data

Mar. 19, 2007 (JP) ................................ 2007-070443

(51) Int. Cl.
G03B 7/00 (2006.01)
(52) U.S. Cl. .................... 348/362; 348/222.1; 348/216.1
(58) Field of Classification Search .................... 348/362
See application file for complete search history.

(56) References Cited

U.S. PATENT DOCUMENTS

| 5,455,621 | A |   | 10/1995 | Morimura |   |
|---|---|---|---|---|---|
| 5,831,676 | A | * | 11/1998 | Takahashi et al. | 348/362 |
| 6,587,149 | B1 | * | 7/2003 | Yoneyama et al. | 348/362 |
| 7,092,019 | B1 |   | 8/2006 | Ogata et al. |   |
| 2002/0012065 | A1 | * | 1/2002 | Watanabe | 348/364 |
| 2006/0033823 | A1 |   | 2/2006 | Okamura |   |
| 2006/0250515 | A1 | * | 11/2006 | Koseki et al. | 348/362 |
| 2006/0269105 | A1 |   | 11/2006 | Langlinais |   |

FOREIGN PATENT DOCUMENTS

| EP | 0 987 855 A2 | 3/2000 |
|---|---|---|
| EP | 1 545 123 A1 | 6/2005 |
| JP | 6-141229 | 5/1994 |
| JP | 2002-84449 | 3/2002 |
| JP | 2004-120205 | 4/2004 |
| JP | 2006-319474 | 11/2006 |

OTHER PUBLICATIONS

Anonymous, "Metering Mode", Wikipedia, the free Encyclopedia, XP002476959, Mar. 16, 2007, pp. 1-3.
U.S. Appl. No. 12/509,741, filed Jul. 27, 2009, Asoma.

* cited by examiner

*Primary Examiner* — Sinh Tran
*Assistant Examiner* — Paul Berardesca
(74) *Attorney, Agent, or Firm* — Oblon, Spivak, McClelland, Maier & Neustadt, L.L.P.

(57) ABSTRACT

An image capturing apparatus includes: an image capturing processing unit capable of selectively performing a normal image capturing process in a normal image capturing mode and a combined image capturing process in a combined image capturing mode, the normal image capturing process being a process of obtaining a single exposure image signal in a unit period and generating captured image data by performing signal processing upon the obtained signal, and the combined image capturing process being a process of obtaining a long-exposure image signal and a short-exposure image signal and generating captured image data by performing signal processing including signal combination upon these obtained signals; a detection unit for performing light metering upon the captured image data; and a control unit for controlling switching between light metering methods used in the detection unit in accordance with an image capturing mode used.

10 Claims, 13 Drawing Sheets

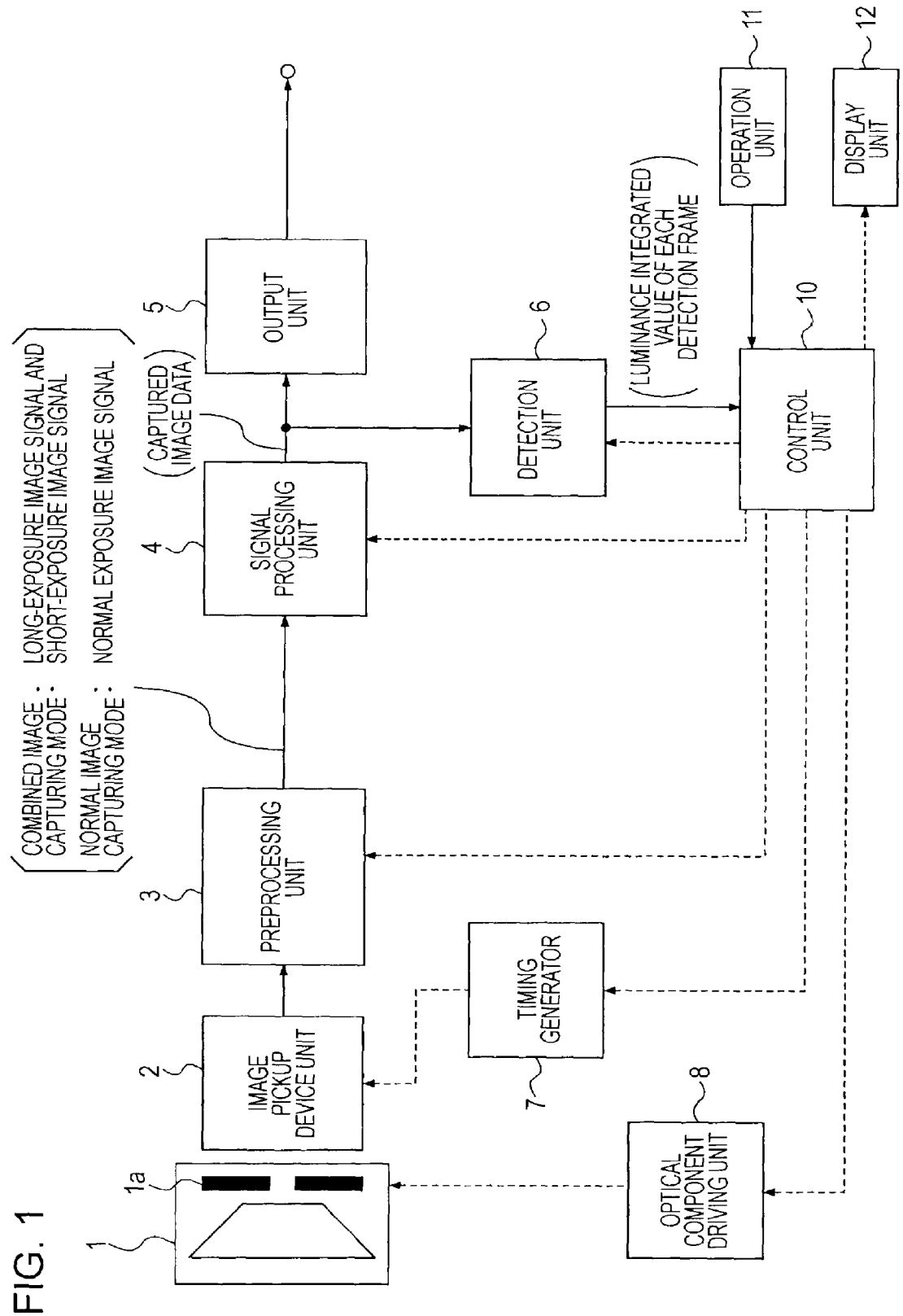

NUMBER OF m DETECTION FRAMES

| W11 | W12 | W13 | W14 | ... | ... | ... | W1m |
|-----|-----|-----|-----|-----|-----|-----|-----|
| W21 | W22 |     |     |     |     |     |     |
| W31 |     |     |     |     |     |     |     |
| W41 |     |     |     |     |     |     |     |
| ⋮   |     |     |     |     |     |     |     |
|     |     |     |     |     |     |     |     |
|     |     |     |     |     |     |     |     |
| Wn1 | ... | ... | ... | ... | ... | ... | Wnm |

AR

NUMBER OF n DETECTION FRAMES

IMAGE CAPTURING APPARATUS, LIGHT METERING METHOD, LUMINANCE CALCULATION METHOD, AND PROGRAM

CROSS REFERENCES TO RELATED APPLICATIONS

The present invention contains subject matter related to Japanese Patent Application JP 2007-070443 filed in the Japanese Patent Office on Mar. 19, 2007, the entire contents of which are incorporated herein by reference.

BACKGROUND OF THE INVENTION

1. Field of the Invention

The present invention relates to image capturing apparatuses, light metering methods, luminance calculation methods, and programs, and, more particularly, to an image capturing apparatus capable of switching between a normal image capturing mode and a combined image capturing mode at the time of image capturing.

2. Description of the Related Art

In image capturing apparatuses in the related art using a solid-state image pickup device such as a CCD (Charge Coupled Device), the quantity of light to be input into the image pickup device (quantity of light exposure) is controlled by controlling an aperture and an electronic shutter speed. That is, when a bright scene is captured, the quantity of light exposure is reduced so as to prevent the occurrence of overexposure that is caused by saturation of a signal output from an image pickup device. Conversely, when a dark scene is captured, the quantity of light exposure is increased so as to prevent the occurrence of underexposure.

However, when a scene with a strong contrast is desired to be captured (image capturing of a backlit subject or simultaneous image capturing of an indoor scene and an outdoor scene) using a solid-state image pickup device with an insufficient dynamic range, even if the quantity of light exposure is controlled, overexposure may occur in a bright portion of the scene due to the saturation of the bright portion and underexposure may occur in a dark portion of the scene. As a result, both of these portions cannot be appropriately reproduced.

As a method of overcoming such a difficulty, Japanese Unexamined Patent Application Publication No. 6-141229 (corresponding U.S. Pat. No. 5,455,621) discloses a method of separately obtaining bright area information and dark area information by using two different electronic shutter speeds in a field or changing an electronic shutter speed for each field, and combining the obtained pieces of information into a single image. This method is employed by apparatuses capable of capturing an image with a wide dynamic range (wide dynamic range cameras). In addition, Japanese Unexamined Patent Application Publication Nos. 2002-84449, 2004-120205 (corresponding patent No. US 2006/033823 A1), and 2006-319474 disclose apparatuses and methods for improving the quality of the above-described combined image.

Japanese Unexamined Patent Application Publication Nos. 2002-84449 and 2004-120205 (corresponding patent No. US 2006/033823 A1) disclose a method of improving image quality of a wide dynamic range camera by improving the method of combining images captured with two significantly different quantities of light exposure, however, they do not describe a light metering method for exposure control.

Wide dynamic range cameras generally have two types of image capturing modes, a combined image capturing mode in which wide dynamic range image capturing is performed and a normal image capturing mode in which the wide dynamic range image capturing is not performed. In general, a light metering method automatically set in the normal image capturing mode (a camera user is not required to perform a setting operation) is a center-weighted metering method or an evaluative metering method. The center-weighted metering method is a method of measuring light concentrating on the center area of an image under the assumption that a main subject exists in the center area. For example, Japanese Unexamined Patent Application Publication No. 2006-319474 discloses this method. The evaluative metering method (this method is also called a multi-segment metering method and a multi-pattern metering method) is a method of dividing an image into a plurality of areas, measuring light in each of these areas, determining whether excessive forward light correction or backlight correction should be performed on the basis of the light measurement results of these areas, and performing appropriate exposure. In the evaluative metering method, an in-focus point is also sometimes taken into consideration, or the image is sometimes divided into a larger number of areas. Thus, an algorithm used for the evaluative metering method varies from camera manufacturer to camera manufacturer.

In order to perform appropriate exposure for a main subject, these two light metering methods in which weights are assigned to a particular part are used in the normal image capturing mode used for image capturing of an image with a narrow wide dynamic range. On the other hand, in the combined image capturing mode used for image capturing of an image with a wider dynamic range, subjects in the entire area of a captured image are required to be visually checked. Accordingly, the above-described light metering methods are not suitable for the combined image capturing mode.

SUMMARY OF THE INVENTION

It is desirable to perform appropriate light metering in an image capturing apparatus capable of switching between a normal image capturing mode and a combined image capturing mode at the time of image capturing.

An image capturing apparatus according to an embodiment of the present invention includes: an image capturing processing unit capable of selectively performing a normal image capturing process in a normal image capturing mode and a combined image capturing process in a combined image capturing mode, the normal image capturing process being a process of obtaining a single exposure image signal in a unit period (for example, one field) and generating captured image data by performing signal processing upon the exposure image signal, and the combined image capturing process being a process of obtaining a long-exposure image signal by exposure for a relatively long period and a short-exposure image signal by exposure for a relatively short period and generating captured image data by performing signal processing including signal combination processing upon the long-exposure image signal and the short-exposure image signal; a detection unit configured to perform light metering upon the captured image data generated by the image capturing processing unit; and a control unit configured to control switching between light metering methods used in the detection unit in accordance with an image capturing mode used, the normal image capturing mode or the combined image capturing mode.

The control unit performs exposure control for the image capturing processing unit on the basis of a result of the light metering performed by the detection unit.

When the normal image capturing process is performed in the normal image capturing mode, the control unit causes the detection unit to use any one of a center-weighted metering method and an evaluative metering method as a light metering method.

When the combined image capturing process is performed in the combined image capturing mode, the control unit causes the detection unit to use an averaging metering method as a light metering method.

When it is determined that an instruction for the use of a partial area metering method has been input during performance of the normal image capturing process in the normal image capturing mode or performance of the combined image capturing process in the combined image capturing mode, the control unit causes the detection unit to use the partial area metering method as a light metering method.

When it is determined that an abnormal condition has been detected during performance of the normal image capturing process in the normal image capturing mode or performance of the combined image capturing process in the combined image capturing mode, the control unit causes the detection unit to use the partial area metering method as a light metering method.

A light metering method according to an embodiment of the present invention is a method for an image capturing apparatus capable of selectively performing a normal image capturing process in a normal image capturing mode and a combined image capturing process in a combined image capturing mode. The normal image capturing process is a process of obtaining a single exposure image signal in a unit period and generating captured image data by performing signal processing upon the exposure image signal. The combined image capturing process is a process of obtaining a long-exposure image signal by exposure for a relatively long period and a short-exposure image signal by exposure for a relatively short period and generating captured image data by performing signal processing including signal combination processing upon the long-exposure image signal and the short-exposure image signal. The light metering method includes the steps of: performing light metering upon the captured image data generated by the image capturing processing unit using any one of a center-weighted metering method and an evaluative metering method when the normal image capturing process is performed in the normal image capturing mode; and performing light metering upon the captured image data generated by the image capturing processing unit using an averaging metering method when the combined image capturing process is performed in the combined image capturing mode.

A luminance calculation method according to an embodiment of the present invention is a method for an image capturing apparatus. The image capturing apparatus includes: an image capturing processing unit capable of selectively performing a normal image capturing process in a normal image capturing mode and a combined image capturing process in a combined image capturing mode, the normal image capturing process being a process of obtaining a single exposure image signal in a unit period and generating captured image data by performing signal processing upon the exposure image signal, and the combined image capturing process being a process of obtaining a long-exposure image signal by exposure for a relatively long period and a short-exposure image signal by exposure for a relatively short period and generating captured image data by performing signal processing including signal combination processing upon the long-exposure image signal and the short-exposure image signal; and a detection unit configured to perform light metering upon the captured image data generated by the image capturing processing unit. The luminance calculation method includes the steps of: controlling switching between light metering methods used in the detection unit in accordance with a image capturing mode used, the normal image capturing mode or the combined image capturing mode; and receiving a value (for example, a luminance integrated value) obtained by light metering performed by the detection unit, and performing computation using the received value on the basis of a light metering method performed in the detection unit to calculate a luminance value per unit area.

A program according to an embodiment of the present invention is a program causing a computer to perform the above-described luminance calculation method.

Thus, in an image capturing apparatus capable of selectively performing a normal image capturing process in a normal image capturing mode and a combined image capturing process in a combined image capturing process, a light metering method is changed in accordance with an image capturing mode used. For example, in the normal image capturing mode, a center-weighted metering method or an evaluative metering method is performed. On the other hand, in a combined image capturing mode used for achievement of a wide dynamic range, the whole area of a captured image is required to be visually checked. Accordingly, a light metering method in which light metering is performed concentrating on a main subject is not suitable for the combined image capturing mode. An averaging metering method (that is also called a whole area metering method) is therefore used in the combined image capturing mode. The averaging metering method (whole area metering method) is a method of performing light metering over the whole area of a captured image and setting an average value of results of the light metering as a luminance level.

According to an embodiment of the present invention, different light metering methods are used in the normal image capturing mode and the combined image capturing mode used for achievement of a wide dynamic range. Accordingly, light metering can be appropriately performed in each of these modes. By performing exposure control on the basis of a result of such appropriate light metering, automatic exposure performance can be improved in the combined image capturing mode without reducing quality of an image with a narrow wide dynamic range which is obtained in the normal image capturing mode.

BRIEF DESCRIPTION OF THE DRAWINGS

FIG. 1 is a block diagram of an image capturing apparatus according to an embodiment of the present invention;

FIG. 6A is a diagram describing a detection frame used in a center-weighted metering method;

FIG. 6B is a diagram describing a detection frame used in an evaluative metering method;

DESCRIPTION OF THE PREFERRED EMBODIMENTS

Embodiments of the present invention will be described below in the following order:
1. Normal Image Capturing Mode and Combined Image Capturing Mode;
2. Configuration of Image Capturing Apparatus;
3. Entire Operation of Image Capturing Apparatus;
4. Exemplary Process I Performed by Control Unit;
5. Exemplary Process II Performed by Control Unit;
6. Exemplary Process III Performed by Control Unit; and
7. Advantage of Embodiment and Program.

1. Normal Image Capturing Mode and Combined Image Capturing Mode

An image capturing apparatus 1 according to an embodiment of the present invention is a wide dynamic range camera capable of performing image capturing in a combined image capturing mode, and is suitable for, for example, use as a surveillance camera. However, the wide dynamic range camera can be used as a digital still camera or a digital video camera targeted for general use. First, the descriptions of a normal image capturing mode and the combined image capturing mode will be made.

It is difficult for commonly used image capturing apparatuses to handle a wide dynamic range between an extremely dark portion and an extremely bright portion in a scene in a normal image capturing operation (the normal image capturing mode). For example, a case is considered in which image capturing is performed in a room with a view during the daytime on a sunny day. At that time, if exposure is performed after a subject in the room has been set as an exposure reference point, the outdoor portion outside the room loses gradation and is overexposed. Conversely, if exposure is performed after the outdoor portion has been set as an exposure reference point, the subject in the room is underexposed. That is, if there is a large difference between luminance levels in a scene, it is difficult to obtain a captured image corresponding to the luminance dynamic range. On the other hand, in the combined image capturing mode, an image with a wide dynamic range which includes no overexposed or underexposed portion is obtained by changing a shutter speed using an electronic shutter function each time an image is captured and combining images that have been obtained with different exposure periods.

However, a user may feel uncomfortable when visually checking an image captured in the combined image capturing mode. Accordingly, it is desirable that a user can select one of the normal image capturing mode and the combined image capturing mode at the time of image capturing in accordance with the user's preference and the purpose for image capturing.

Figure 2A:
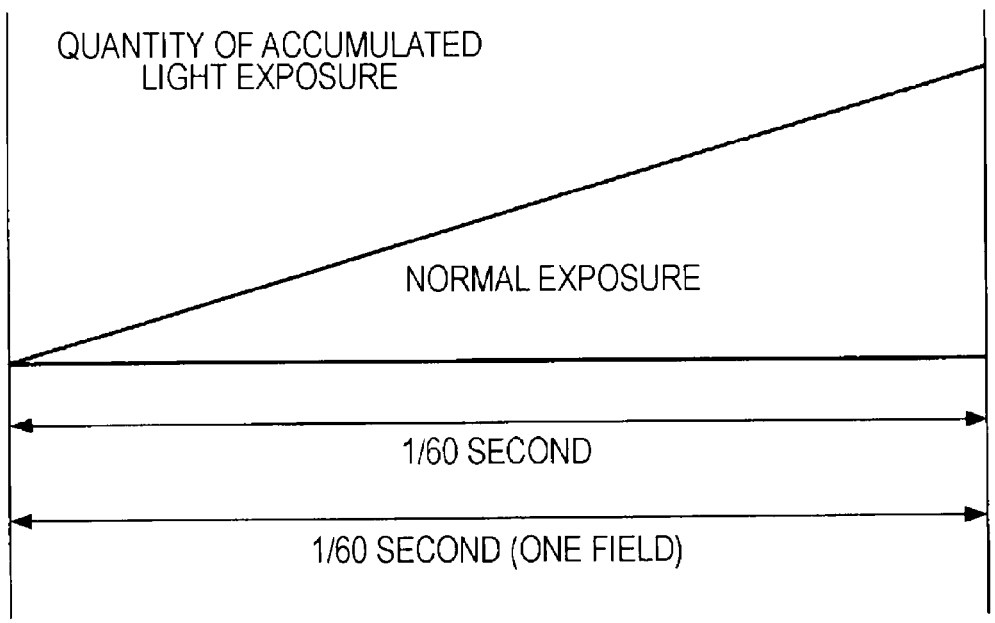
FIG. 2A is a diagram describing exposure processing performed in a normal image capturing mode.
Figure 2B:
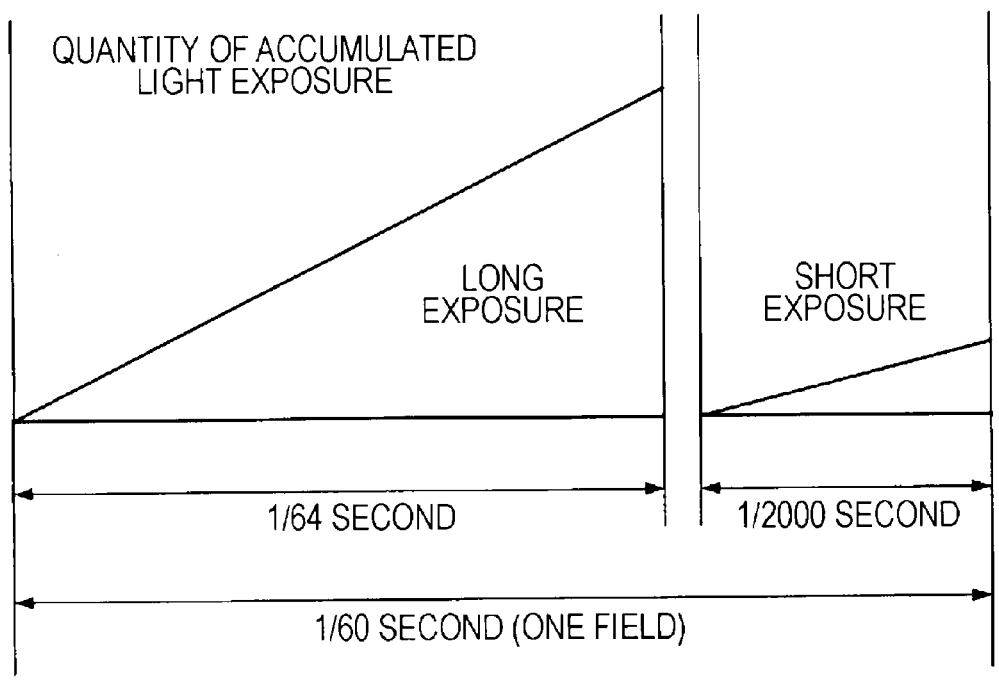
FIG. 2B is a diagram describing exposure processing performed in a combined image capturing mode.

FIGS. 2A and 2B illustrate the relationship between an exposure period in one field and the quantity of accumulated light exposure (the amount of electrical charge) in an image pickup device unit such as a CCD or CMOS (Complementary Metal Oxide Semiconductor) sensor array. FIG. 2A illustrates a case in which exposure is performed in one field period of $1/60$ second, which is an image capturing unit period, in the normal image capturing mode. Here, the exposure period may not be $1/60$ second. Another exposure period may be set as an electronic shutter speed. Thus, in the image pickup device unit, exposure is performed for a certain exposure period in one field period, whereby a one-field exposure image signal is obtained. Predetermined signal processing is performed upon this exposure image signal, whereby one-field captured image data is generated.

FIG. 2B illustrates a case in which a long exposure of $1/64$ second and a short exposure of $1/2000$ second are performed in one field period of $1/60$ second in the combined image capturing mode. The exposure periods of the long exposure and the short exposure may be changed. By performing the long exposure and the short exposure, a long-exposure image signal and a short-exposure image signal are obtained in one field period. The obtained image signals are combined into one-field captured image data. The long exposure and the short exposure may not be performed in one field period. A case can be considered in which the long exposure is performed in a certain field period, the short exposure is performed in the next field period, and then the obtained exposure image signals are combined.

Figure 3:
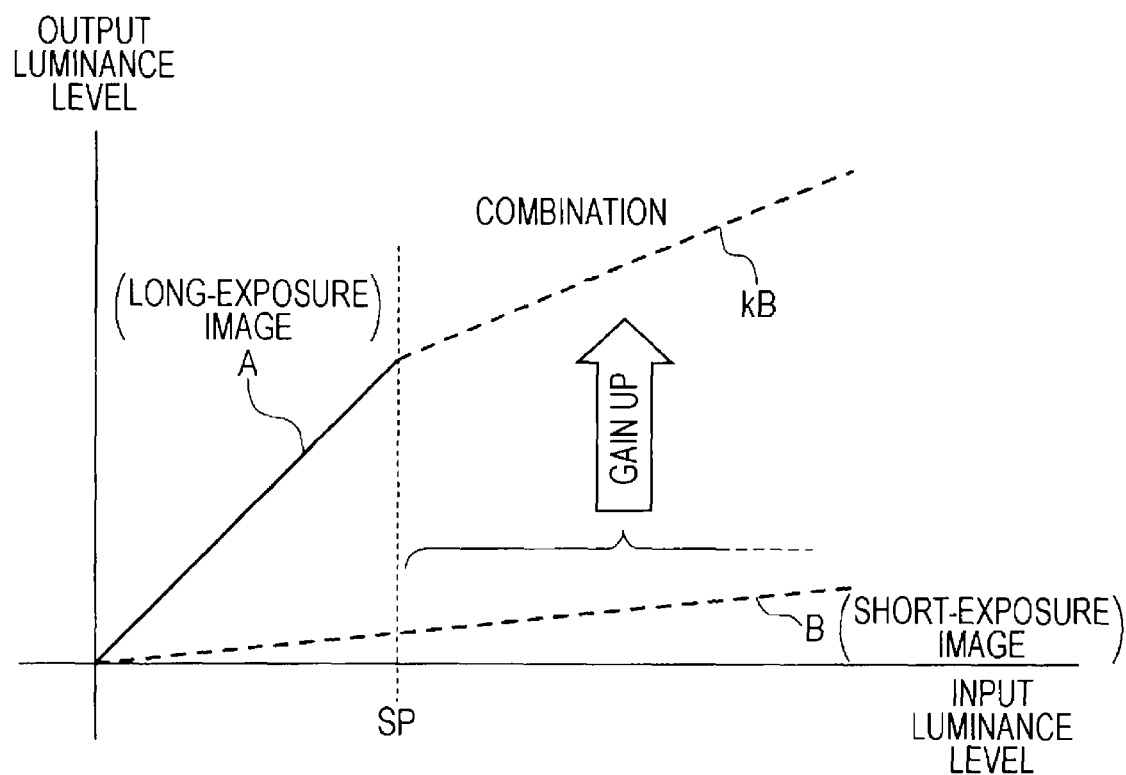
FIG. 3 is a diagram describing signal combination processing according to an embodiment of the present invention.

FIG. 3 illustrates an input-output luminance characteristic A of a long-exposure image signal and an input-output luminance characteristic B of a short-exposure image signal for the description of signal combination processing of the long exposure image signal and the short exposure image signal. In signal combination processing, for example, a certain luminance value is set as a switching point SP. A pixel having a luminance level lower than the switching point SP uses the long-exposure image signal as a pixel signal. On the other hand, a pixel having a luminance level higher than the switching point SP uses the short-exposure image signal as a pixel signal. At that time, the exposure ratio of the long-exposure image signal to the short-exposure image signal is multiplied by the short-exposure image signal, whereby the level adjustment of these image signals is performed. It is assumed that the exposure ratio of the long-exposure image signal to the short-exposure image signal is 10:1. In this case, the exposure level of the short-exposure image signal is one-tenth that of the long-exposure image signal. However, existing light quantity is at least ten times the luminance level of the short-exposure image signal. Accordingly, the short-exposure image signal is multiplied by the value of 10 for level adjustment. Thus, by performing a gain multiplication of the short-exposure image signal, a characteristic kB the level of which is adjusted to the characteristic of the long-exposure image signal can be obtained as illustrated in the drawing. Consequently, a combined image having a characteristic A-kB is generated. That is, the long-exposure image signal is used in a relatively dark portion in a scene so as to prevent the occurrence of underexposure and the short-exposure image signal is used in a relatively bright portion so as to prevent the occurrence of overexposure. Consequently, a combined image including no overexposed portion and no underexposed portion is generated.

As a method of capturing in the combined image capturing mode an image of a subject having a wide dynamic range between a bright portion and a dark portion, there are various methods other than the above-described method of combining a bright image and a dark image which have been obtained by changing an exposure period. For example, these various methods include a method of changing sensitivity on a pixel-by-pixel basis, extracting only signals having the same exposure conditions, reproducing an image using the extracted signals, and combining one or more images having different exposure conditions, and a method of separating incident light using a prism, and combining signals output from an image pickup device attached to a filter having a light reduction function such as an ND filter (Neutral Density filter: light quantity control filter) for reducing the quantities of light of all wavelengths transmitted therethrough, that is, reducing the quantities of incident light equally.

In the combined image capturing mode using one of the above-described methods, a dynamic range extremely wider than that obtained in the normal image capturing mode can be obtained. Accordingly, in the combined image capturing mode, an image of a subject having a wide dynamic range can be captured. A subject having a wide dynamic range means that the output image of the subject includes a bright portion and a dark portion. For example, the combined image capturing mode is suitable for use in cameras required to perform image capturing in a room where strong light enters from outside or a place where there is a large difference between luminance levels. More specifically, the combined image capturing mode is suitable for use in cameras required to perform image capturing in a place where a dynamic range significantly differs in accordance with an image capturing time in the daytime or nighttime, for example, at the entrance of a bank or on a road where traffic conditions are monitored.

An exposure operation performed in the normal image capturing mode illustrated in FIG. 2A is hereinafter referred to as "normal exposure" so as to be distinguished from the long exposure and the short exposure which are performed in the combined image capturing mode illustrated in FIG. 2B. An exposure image signal obtained by the normal exposure is hereinafter referred to as a "normal exposure image signal" so as to be distinguished from the long-exposure image signal and the short-exposure image signal.

2. Configuration of Image Capturing Apparatus

FIG. 1 illustrates the configuration of an image capturing apparatus according to an embodiment of the present invention. An image capturing apparatus according to an embodiment of the present invention includes an image capturing optical system 1, an image pickup device unit 2, a preprocessing unit 3, a signal processing unit 4, an output unit 5, a detection unit 6, a timing generator 7, an optical component driving unit 8, a control unit 10, an operation unit 11, and a display unit 12.

The image capturing optical system 1 includes optical components such as a lens, an optical filter for removing an unnecessary wavelength component, and an aperture 1a. Light is transmitted from a subject to the image pickup device unit 2 via each optical component included in the image capturing optical system 1. The image pickup device unit 2 is a solid-state image pickup device unit such as a CCD sensor array or a CMOS sensor array. The image pickup device unit 2 photoelectrically converts the light transmitted via the image capturing optical system 1 into an electric signal, and outputs the electric signal so as to generate a captured image. In this embodiment, the image pickup device unit 2 performs different exposure processing operations in the normal image capturing mode and the combined image capturing mode.

That is, in the normal image capturing mode illustrated in FIG. 2A, the image pickup device unit 2 performs the normal exposure for a predetermined period in one field period, and outputs an electric signal as an exposure image signal. On the other hand, in the combined image capturing mode illustrated in FIG. 2B, the image pickup device unit 2 performs the long exposure and the short exposure in one field period, and outputs time-shared electric signals as the long-exposure image signal and the short-exposure image signal. The image pickup device unit 2 may not be a solid-state image pickup device unit, and may be a nonsolid-state image pickup device unit such as an image pickup tube. A nonsolid-state image pickup device can also perform the long exposure and the short exposure and change an exposure period for the normal exposure, the long exposure, or the short exposure by using a mechanical shutter or a liquid crystal shutter. The preprocessing unit 3 is a so-called Analog Front End, and performs CDS (Correlated Double Sampling) processing, gain processing using a programmable gain amplifier, and A/D conversion processing upon the electric signal used for generation of a captured image, and supplies the processed exposure image signal to the signal processing unit 4. That is, the normal exposure image signal is supplied to the signal processing unit 4 in the normal capturing mode, and the long-exposure image signal and the short-exposure image signal are supplied to the signal processing unit 4 in the combined image capturing mode.

The signal processing unit 4 performs necessary signal processing in accordance with a selected image capturing mode, the normal image capturing mode or the combined image capturing mode, so as to generate captured image data. In the normal image capturing mode, for example, the signal processing unit 4 performs gamma correction and white balance control upon the received normal exposure image signal so as to generate captured image data. In the combined image capturing mode, the signal processing unit 4 performs the signal combination processing described with reference to FIG. 3 upon the received long-exposure image signal and the received short-exposure image signal. That is, the signal processing unit 4 performs timing control and color balance correction upon the long-exposure image signal and the short-exposure image signal which have been supplied in accordance with a time-sharing method, performs gain processing so as to make the luminance level of the short-exposure image signal conform to that of the long-exposure image signal, and performs signal combination of these signals. In addition, the signal processing unit 4 also performs gamma correction and white balance control upon the combined image signal so as to generate captured image data, and outputs the captured image data to the output unit 5 and the detection unit 6.

The output unit 5 performs processing so as to display an image on a display monitor using the captured image data transmitted from the signal processing unit 4 or so as to transmit the captured image data to an external apparatus.

The detection unit 6 performs light metering upon the captured image data transmitted from the signal processing unit 4 so as to calculate a luminance integrated value, and supplies information about the calculated luminance integrated value to the control unit 10. At that time, in the detection unit 6, a light metering method to be executed is selected from among a center-weighted metering method, an evaluative metering method, an averaging metering method, and an partial area metering method in accordance with an instruction transmitted from the control unit 10. As will be described later, a detection frame in an image area differs in accordance with a selected light metering method. The detection unit 6 supplies a luminance integrated value of each detection frame set in a selected light metering method to the control unit 10.

The control unit 10 is a microcomputer including, for example, a CPU (Central Processing Unit), a ROM (Read-Only Memory), a RAM (Random Access Memory), and a flash memory, and controls the entire operation of the image capturing apparatus. In this embodiment, the control unit 10 controls the image pickup device unit 2, the preprocessing unit 3, the signal processing unit 4, and the timing generator 7 so as to cause each of them to perform an image capturing operation for the normal image capturing mode or an image capturing operation for the combined image capturing mode. In addition, the control unit 10 controls the selection of a light metering method performed in the detection unit 6 and performs exposure control. The ROM included in the control unit 10 stores a program causing the control unit 10 to execute the above-described control processing operations. The control unit 10 executes necessary computation and control processing using the program.

The timing generator 7 generates an operating pulse for the image pickup device unit 2 that is, for example, a CCD. For example, the timing generator 7 generates various pulses such as a four-phase pulse for vertical transfer, a field shift pulse, a two-phase pulse for horizontal transfer, and a shutter pulse, and supplies them to the image pickup device unit 2. The timing generator 7 can drive the image pickup device unit 2 (electronic shutter function). The timing generator 7 causes the image pickup device unit 2 to perform the normal exposure for a predetermined period in one field period as illustrated in FIG. 2A when receiving an instruction for setting the normal image capturing mode from the control unit 10, and causes the image pickup device unit 2 to perform the long exposure, the exposure period of which is a relatively long, and the short exposure, the exposure period of which is a relatively short, as illustrated in FIG. 2B when receiving an instruction for setting the combined image capturing mode from the control unit 10. A normal exposure period for the normal image capturing mode, the long exposure period and the short exposure period for the combined image capturing mode can be changed.

The optical component driving unit 8 drives the optical components included in the image capturing optical system 1. In this embodiment, the optical component driving unit 8 is a driving circuit for driving at least the aperture 1a and controlling incident light. The operation unit 11 and the display unit 12 function as user interfaces. The operation unit 11 outputs operational information to the control unit 10 in accordance with a user's operation. The display unit 12 displays pieces of information such as operational state information, time information, mode information, and a message, which should be displayed for users, in response to an instruction transmitted from the control unit 10. Each of the operation unit 11 and the display unit 12 may be an apparatus independent of the image capturing apparatus. Information that should be displayed on the display unit 12 may be superimposed on the captured image data as a character image in the output unit 5 and then be displayed on a display monitor for displaying a captured image.

3. Entire Operation of Image Capturing Apparatus

Figure 4A:
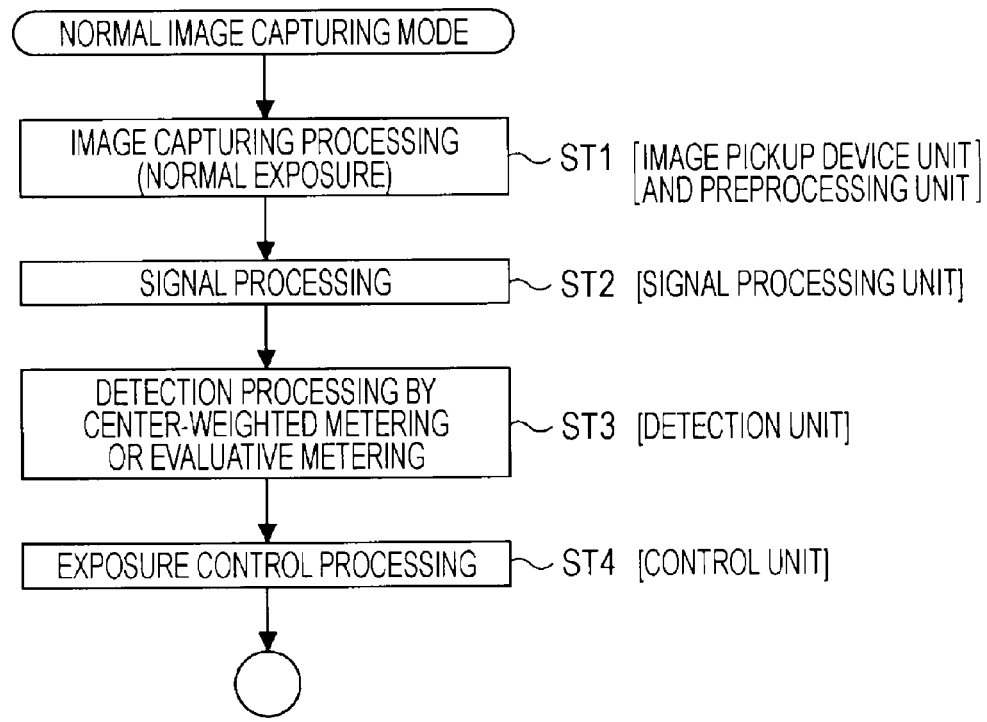
FIGS. 4A and 4B are flowcharts illustrating processes performed by an image capturing apparatus according to an embodiment of the present invention.
Figure 4B:
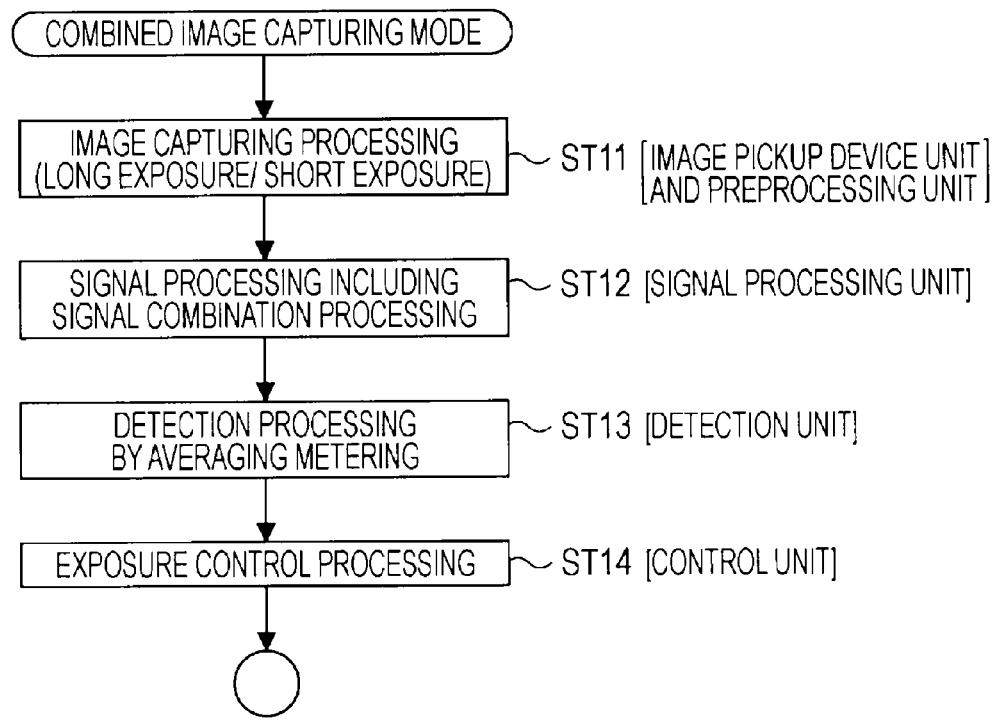

In the following, operations performed in an image capturing apparatus according to an embodiment of the present invention will be described. First, the entire image capturing process of the image capturing apparatus, which includes exposure control performed in the normal image capturing mode and exposure control performed in the combined image capturing mode, will be described. A process from step ST1 to step ST4 illustrated in FIG. 4A denotes a process performed in the normal image capturing mode. A process from step ST11 to step ST14 illustrated in FIG. 4B denotes a process performed in the combined image capturing mode. The process illustrated in FIG. 4A or 4B is repeated at regular intervals, whereby exposure control is performed during image capturing.

First, the process performed in the normal image capturing mode will be described with reference to FIG. 4A.

Step ST1: Image Capturing Processing

The image pickup device unit 2 performs the normal exposure illustrated in FIG. 2A, thereby generating the normal exposure image signal. The generated normal exposure image signal is processed by the preprocessing unit 3 and is then supplied to the signal processing unit 4.

Step ST2: Signal Processing

The signal processing unit 4 performs necessary processing upon the normal exposure image signal, which has been digitalized by the preprocessing unit 3, so as to generate the captured image data. The captured image data is output from the output unit 5 so as to be displayed on, for example, a display monitor.

Step ST3: Detection Processing

Figure 5:
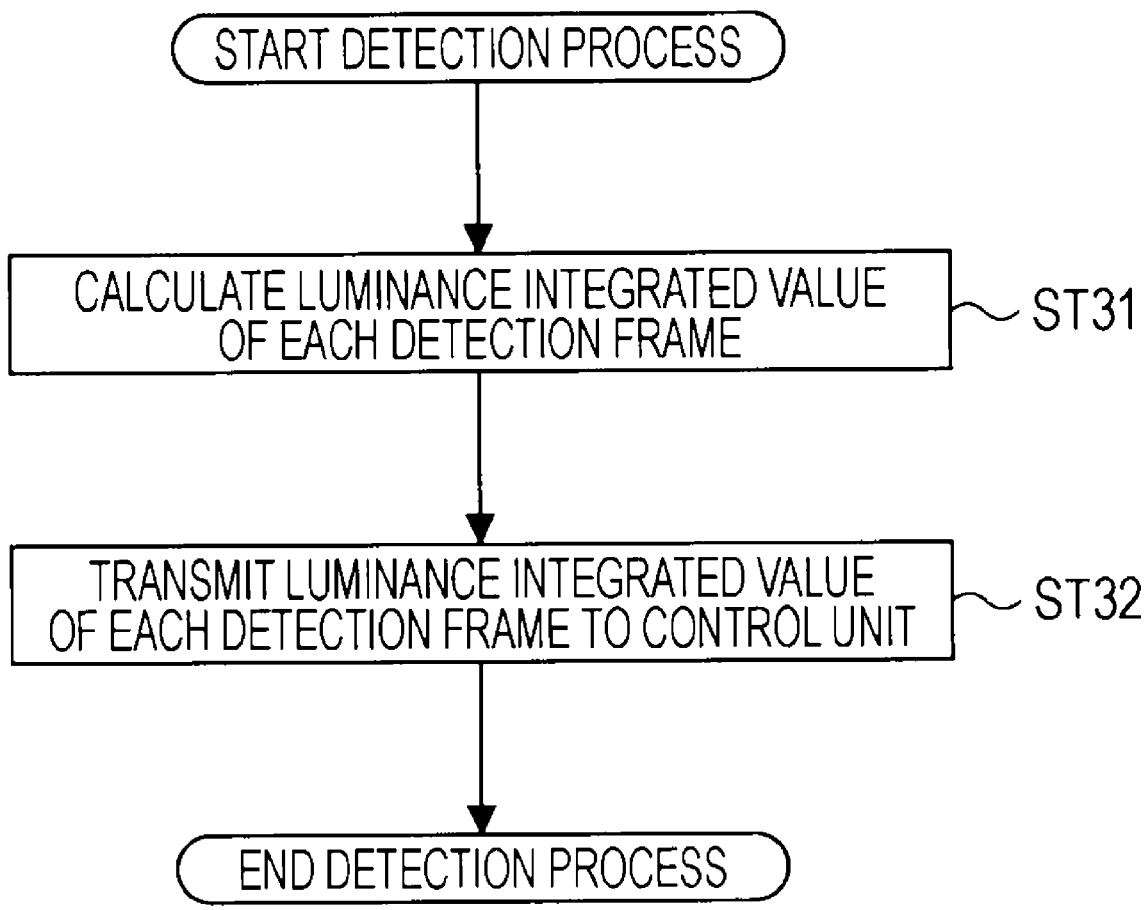
FIG. 5 is a flowchart illustrating a detection process according to an embodiment of the present invention.

The captured image data is also supplied to the detection unit 6. The detection unit 6 performs light metering upon the captured image data for each field, obtains a luminance integrated value of each detection frame, and transmits the obtained luminance integrated value of each detection frame to the control unit 10. FIG. 5 illustrates a detection process performed by the detection unit 6. In step ST31, the detection unit 6 calculates a luminance integrated value of each detection frame set on an image corresponding to the one-field captured image data. In step ST32, the detection unit 6 transmits the calculated luminance integrated value of each detection frame to the control unit 10. In the normal image capturing mode, the detection unit 6 performs light metering using the center-weighted metering method or the evaluative metering method. FIG. 6A illustrates exemplary detection frames used in the center-weighted metering method. The center-weighted metering method is a method of measuring light concentrating on the center area of an image capturing area AR under the assumption that a main subject exists in the center area. Accordingly, a detection frame W2 is set for the center area and a detection frame W1 is set for a peripheral area around the center area. In this case, the detection unit 6 calculates luminance integrated values of the detection frames W1 and W2, and supplies the calculation results to the control unit 10. FIG. 6B illustrates exemplary detection frames used in the evaluative metering method. In the evaluative metering method, for example, the image capturing area AR is divided into m frames in the horizontal direction and n frames in the vertical direction. Consequently, as illustrated in the drawing, the detection frames W11 to Wnm are set. In this case, the detection unit 6 calculates a luminance integrated value of each of the detection frames W11 to Wnm, and supplies the calculation results to the control unit 10.

Step ST4: Exposure Control Processing

The control unit 10 performs exposure control using the luminance integrated value of each detection frame. If the detection unit 6 performs light metering using the center-weighted metering method and supplies the luminance integrated values of the detection frames W1 and W2 illustrated in FIG. 6A to the control unit 10, the control unit 10 assigns weights to the luminance integrated value of the detection frame W2, which is in the center area of an image, so as to obtain a luminance level per unit area. For example, it is assumed that the weight of the detection frame W2 is 100%. At that time, the weight of the detection frame W1 is set to 20% and then a weighted average of them is obtained, whereby a luminance level per unit area is obtained. On the other hand, if the detection unit 6 performs light metering using the evaluative metering method and supplies the luminance integrated values of the detection frames W11 to Wnm illustrated in FIG. 6B to the control unit 10, the control unit 10 performs a predetermined algorithm computation using these luminance integrated values so as to obtain a luminance level per unit area. Subsequently, a difference between the obtained current luminance level per unit area and a target luminance level is calculated as the amount of exposure control. The exposure control is performed on the basis of the calculated amount of exposure control. More specifically, the amounts of control required for settings of the aperture value of the aperture 1a, the normal exposure period of the image pickup device unit 2, and the gain of the PGA (Programmable Gain Amplifier) included in the preprocessing unit 3 are calculated. Subsequently, the control unit 10 causes the optical component driving unit 8 to drive the aperture 1a, transmits information about the normal exposure period to the timing generator 7, and transmits information about the gain of the PGA to the preprocessing unit 3. All of these three control processing operations may not be performed. One or two of them may be performed.

Next, a process performed in the combined image capturing mode will be described with reference to FIG. 4B.

Step ST11: Image Capturing Processing

The image pickup device unit 2 performs the long exposure and the short exposure illustrated in FIG. 2B. That is, the timing generator 7 can set two different electronic shutter speeds in one field period, and causes the image pickup device unit 2 to perform the long exposure and the short exposure in one field. Consequently, two image capturing signals having different quantities of light exposure (for example, a long-exposure image signal obtained by exposure for an exposure period of 1/64 second and a short-exposure image signal obtained by exposure for an exposure period of 1/2000 second) are obtained. As described previously, the long-exposure image signal and the short-exposure image signal are processed by the preprocessing unit 3, and are then supplied to the signal processing unit 4.

Step ST12: Signal Processing

The signal processing unit 4 combines, using the method described with reference to FIG. 3, the long-exposure image signal and the short-exposure image signal which have been digitalized by the preprocessing unit 3 so as to generate captured image data as a combined image with a wider dynamic range. The captured image data is output from the output unit 5 so as to be displayed on, for example, a display monitor.

Step ST13: Detection Processing

Figure 7A:
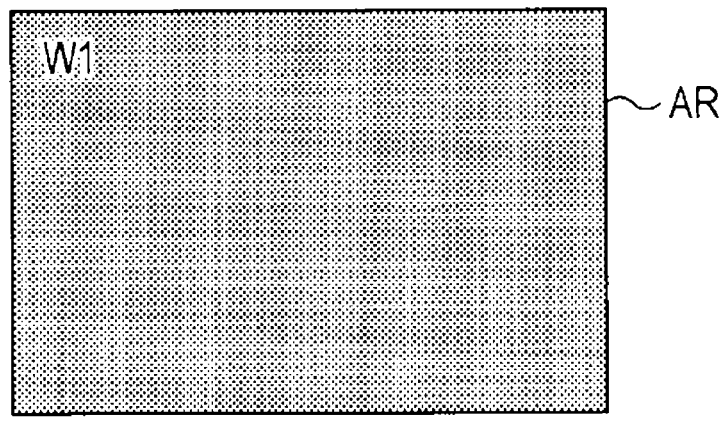
FIG. 7A is a diagram describing a detection frame used in an averaging metering method.

The captured image data is also supplied to the detection unit 6. As described previously in steps ST31 and ST32 illustrated in FIG. 5, the detection unit 6 performs light metering upon the captured image data for each field, calculates a luminance integrated value of each detection frame, and transmits the calculation result of each detection frame to the control unit 10. In the combined image capturing mode, the detection unit 6 performs the light metering using the averaging metering method. A detection frame used in the averaging metering method is illustrated in FIG. 7A. The averaging metering (whole area metering) is a method of measuring light over the whole area of a captured image, and obtains an average luminance level of the whole area. Accordingly, the whole of the image capturing area AR is set as a single detection frame W1. The detection unit 6 calculates a luminance integrated value of the whole of the image capturing area AR, which is set as the detection frame W1, and supplies the calculation result to the control unit 10.

Step ST14: Exposure Control Processing

The control unit 10 performs exposure control using the luminance integrated value of the detection frame W1 used in the averaging metering method. For example, the control unit 10 obtains an average luminance level per unit area from the luminance integrated value of the detection frame W1, calculates a difference between the current luminance level per unit area and a target luminance level as a control amount of exposure, and performs exposure control on the basis of the calculated control amount of exposure. More particularly, the control unit 10 calculates the amounts of control required for settings of the aperture value of the aperture 1a, the long-exposure and short-exposure periods of the image pickup device unit 2, and the gain of the PGA (Programmable Gain Amplifier) included in the preprocessing unit 3. Subsequently, the control unit 10 causes the optical component driving unit 8 to drive the aperture 1a, transmits information about the long-exposure period and information about the short-exposure period to the timing generator 7, and transmits information about the gain of the PGA to the preprocessing unit 3. All of these three control processing operations may not be performed. One or two of them may be performed.

4. Exemplary Process I Performed by Control Unit

An exemplary process performed by the control unit 10 which is required for the performance of the process illustrated in FIG. 4A or 4B in the normal capturing mode or the combined image capturing mode will be described with reference to FIG. 8. In steps F101 and F102, the control unit 10 monitors the occurrence of a trigger instructing the start of image capturing in the combined image capturing mode or the normal image capturing mode. For example, the trigger instructing the start of image capturing is input by a user or transmitted from an external apparatus.

If image capturing is started in the normal image capturing mode, the process proceeds from step F102 to step F105 in which the control unit 10 instructs the timing generator 7, the preprocessing unit 3, and the signal processing unit 4 to start an operation in the normal capturing mode. In step F106, the control unit 10 instructs the detection unit 6 to use the center-weighted metering method or the evaluative metering method. Consequently, the processing operations of steps ST1, ST2, and ST3 illustrated in FIG. 4A are individually started in corresponding units.

On the other hand, if image capturing is started in the combined image capturing mode, the process proceeds from step F101 to step F103 in which the control unit 10 instructs the timing generator 7, the preprocessing unit 3, and the signal processing unit 4 to start an operation in the combined image capturing mode. In step F104, the control unit 10 instructs the detection unit 6 to use the averaging metering method. Consequently, the processing operations of steps ST11, ST12, and ST13 illustrated in FIG. 4B are individually started in corresponding units.

After the image capturing has been started in the normal image capturing mode or the combined image capturing mode, the control unit 10 repeats an exposure control process (steps F108, F109, and F110) on a frame period-by-frame period basis until the end of the image capturing in step F107. That is, the processing of step ST4 illustrated in FIG. 4A or step ST14 illustrated in FIG. 4B is performed. In step F108, the control unit 10 receives the luminance integrated value of each detection frame from the detection unit 6, and calculates a luminance level per unit area from the received luminance integrated values on the basis of the light metering method performed in the detection unit 6. In step F109, the control unit 10 calculates a difference between the luminance level per unit area and a target luminance level as the control amount of exposure. That is, the control unit 10 calculates the amounts of control required for settings of the aperture value of the aperture 1*a*, an exposure period of the image pickup device unit 2 (the normal exposure period, or the long-exposure period and the short-exposure period), and the gain of the PGA included in the preprocessing unit 3. In step F110, the control unit 10, on the basis of the calculated amounts of control, causes the optical component driving unit 8 to drive the aperture 1*a*, transmits information about the exposure period to the timing generator 7, and transmits information about the gain of the PGA included in the preprocessing unit 3 to the preprocessing unit 3.

In step F107, if the control unit 10 detects the occurrence of a trigger instructing the termination of the image capturing which has been input by a user, the process proceeds to step F111 in which the control unit 10 causes each unit to terminate the image capturing operation, thereby terminating the image capturing control process. The process illustrated in FIG. 8 is performed by the control unit 10, whereby the image capturing process illustrated in FIG. 4A or 4B is performed in the normal image capturing mode or the combined image capturing mode.

5. Exemplary Process II Performed by Control Unit

Figure 8:
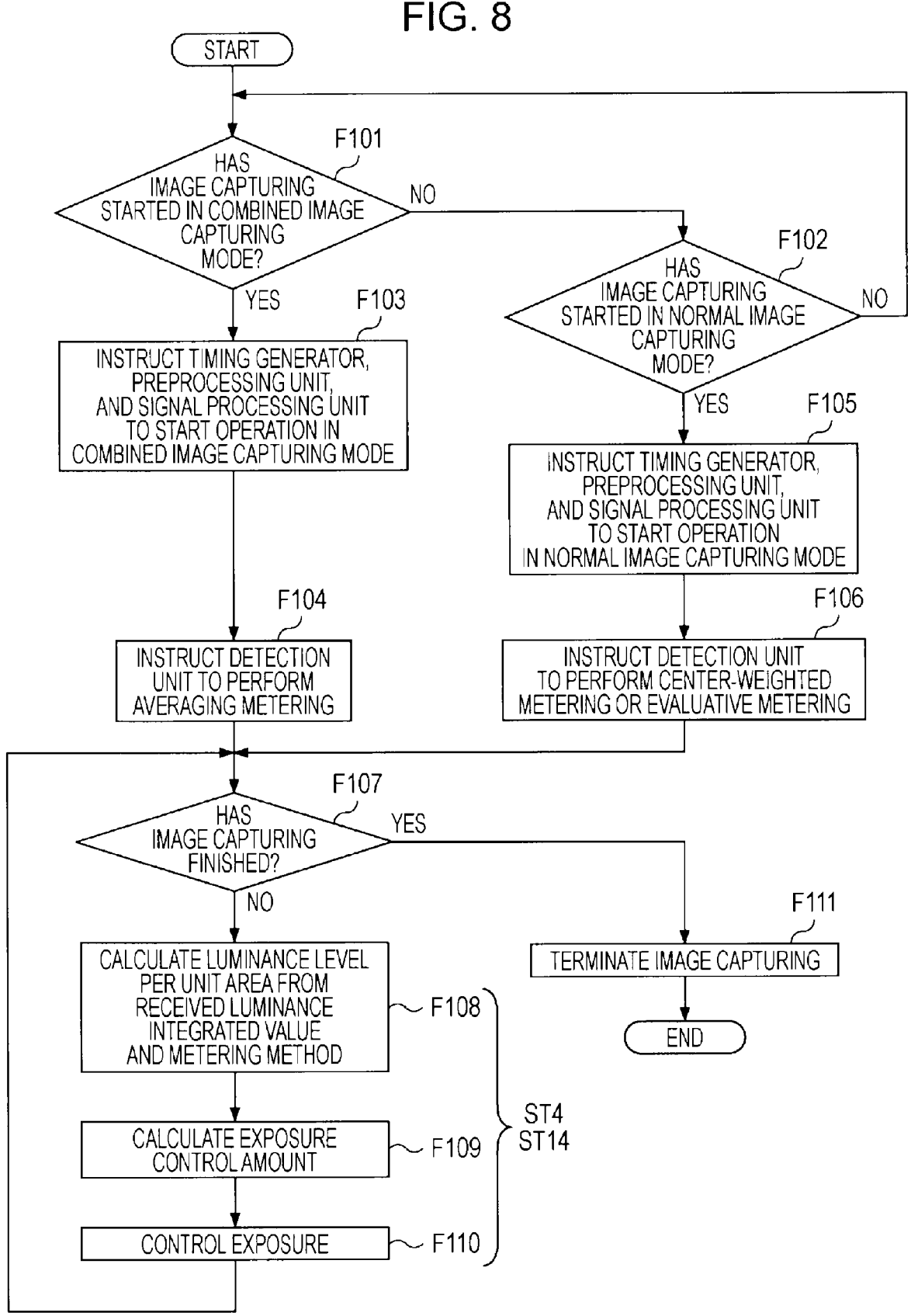
FIG. 8 is a flowchart illustrating an exemplary process I performed by a control unit according to an embodiment of the present invention.

According to the exemplary process I illustrated in FIG. 8 which is performed by the control unit 10, light metering is performed in the detection unit 6 using the center-weighted metering method or the evaluative metering method when the normal image capturing mode is set, and light metering is performed in the detection unit 6 using the averaging metering method when the combined image capturing mode is set. Furthermore, such a case in which light metering is performed in the detection unit 6 using a partial area metering method in addition to the above-described metering methods can be considered. This case will be described as the exemplary process II.

Figure 7B:
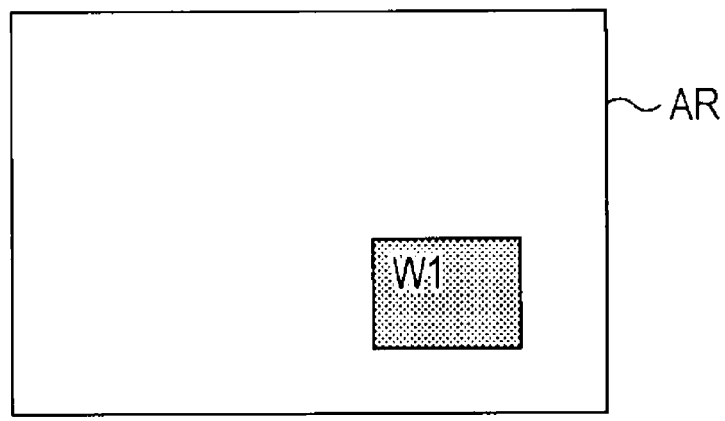
FIG. 7B is a diagram describing a detection frame used in a partial area metering method.

The partial area metering method (that is also referred to as a spot metering method) is a method of performing light metering upon only an extremely narrow area of an image, and is used for a case in which a user desires to set a part of a subject as an exposure reference point. A light metering range (detection frame) is determined by a user of an image capturing apparatus. For example, FIG. 7B illustrates the detection frame W1 used in the partial area metering method. As illustrated in the drawing, an area specified by a user is set as the detection frame W1 in the image capturing area AR. If the detection unit 6 performs light metering using the partial area metering method, it calculates a luminance integrated value of the specified detection frame W1 and supplies the calculation result to the control unit 10. The partial area metering method is not automatically set. A user of an image capturing apparatus specifies a particular area in an image capturing area such that the specified area can be appropriately exposed to light. Accordingly, if a user instructs the use of the partial area metering method, light metering can be performed using the partial area metering method regardless of a currently selected mode (the combined image capturing mode or the normal image capturing mode).

Figures 9, 9A, 9B:
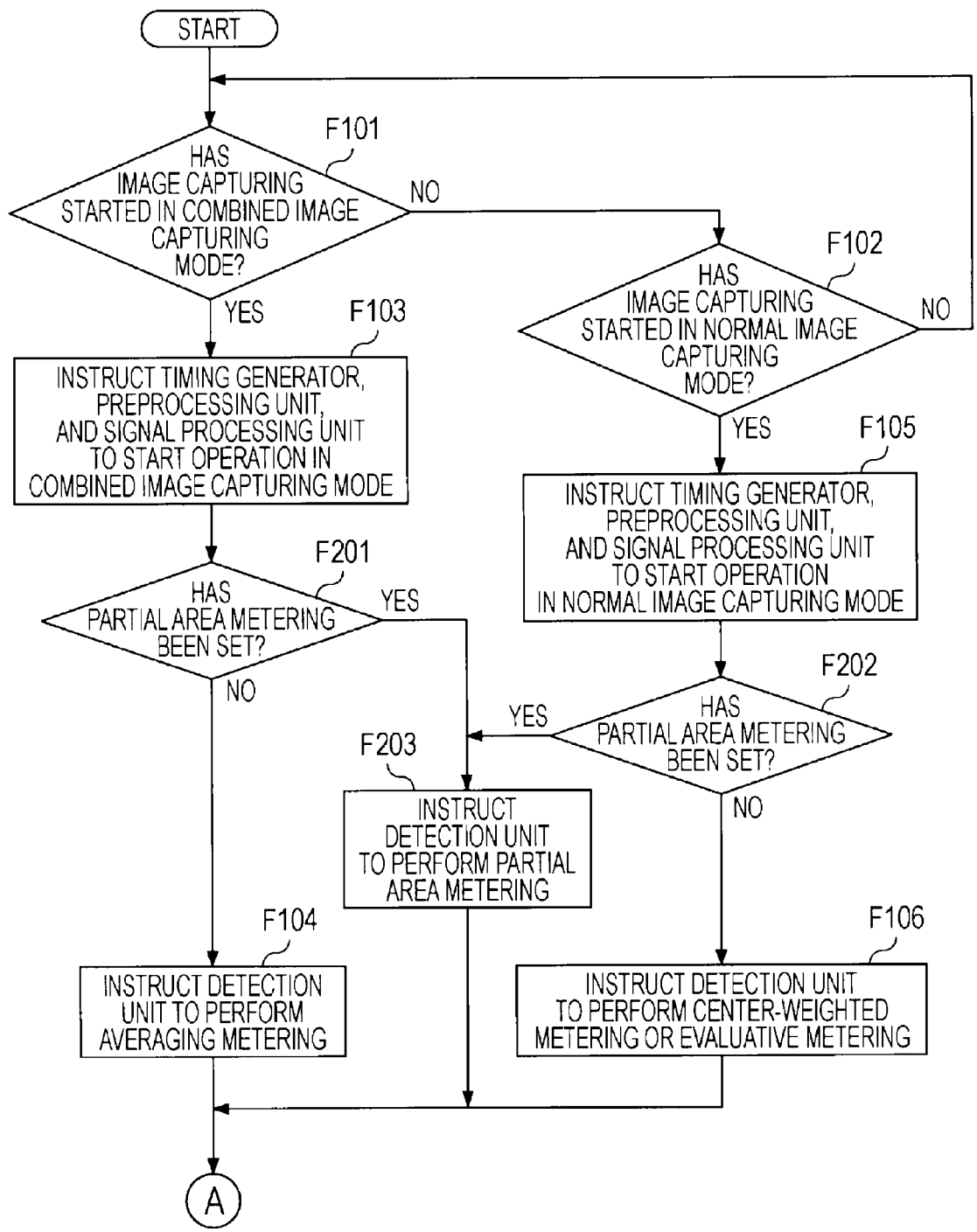
FIG. 9 is a flowchart illustrating an exemplary process II performed by a control unit according to an embodiment of the present invention.
Figure 9B:
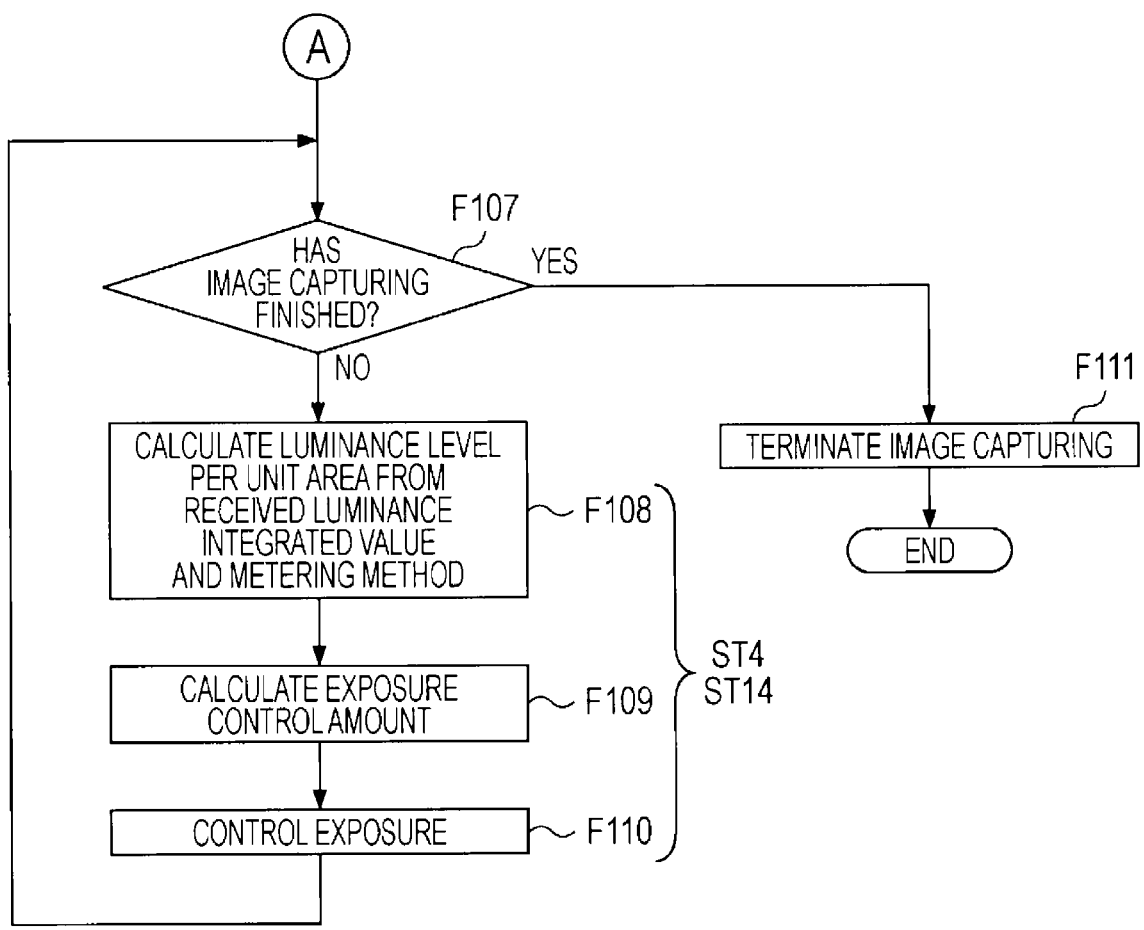

FIG. 9 illustrates a process that takes the partial area metering method into consideration and is performed by the control unit 10. Descriptions of steps F101 to F111 illustrated in FIG. 9 have already been made with reference to FIG. 8. This process illustrated in FIG. 9 is obtained by adding the processing operations of steps F201, F202, and F203 to the process illustrated in FIG. 8.

A case in which an image capturing process in the combined image capturing mode has been started from step F103 will be considered. In this case, the control unit 10 determines in step F201 whether the use of the partial area metering method has been instructed by a user. If it is determined that the use of the partial area metering method has not been instructed, the process proceeds to step F104 in which the control unit 10 causes the detection unit 6 to use the averaging metering method. On the other hand, if it is determined in step F201 that the use of the partial area metering method has been instructed, the process proceeds to step F203 in which the control unit 10 causes the detection unit 6 to use the partial area metering method. On the other hand, a case in which an image capturing process in the normal image capturing mode has been started from step F105 will be considered. In this case, the control unit 10 determines in step F202 whether the use of the partial area metering method has been instructed by a user. If it is determined that the use of the partial area metering method has not been instructed, the process proceeds to step F106 in which the control unit 10 causes the detection unit 6 to use the center-weighted metering method or the evaluative metering method. On the other hand, if it is determined in step F202 that the use of the partial area metering method has been instructed, the process proceeds to step F203 in which the control unit 10 causes the detection unit 6 to use the partial area metering method.

The subsequent process is performed from step F107 as described preciously with reference to FIG. 8. If the partial area metering method is performed, the control unit 10 calculates a luminance level per unit area by performing computation on the basis of the partial area metering method in step F108. That is, an average luminance level per unit area is calculated using the luminance integrated value of the detection frame W1 used in the partial area metering method. According to the exemplary process illustrated in FIG. 9, light metering is basically performed in the detection unit 6 using the center-weighted metering method or the evaluative metering method when the normal image capturing mode is set or using the averaging light metering method when the combined image capturing mode is set, and light metering is performed in the detection unit 6 using the partial area metering method when a user instructs the use of the partial area metering method.

6. Exemplary Process III Performed by Control Unit

An exemplary process III performed by the control unit 10 included in an image capturing apparatus that is suitable for use as a surveillance camera will be described. If a surveillance camera (security camera) detects an abnormal condition (intrusion of a suspicious person) in a particular area included in a captured image during the performance of the averaging light metering in the combined image capturing mode, a user may desire to obtain a sharper image of the area. In such a case, it is desirable that the partial area metering method be set by the user or be automatically set.

Figure 10:
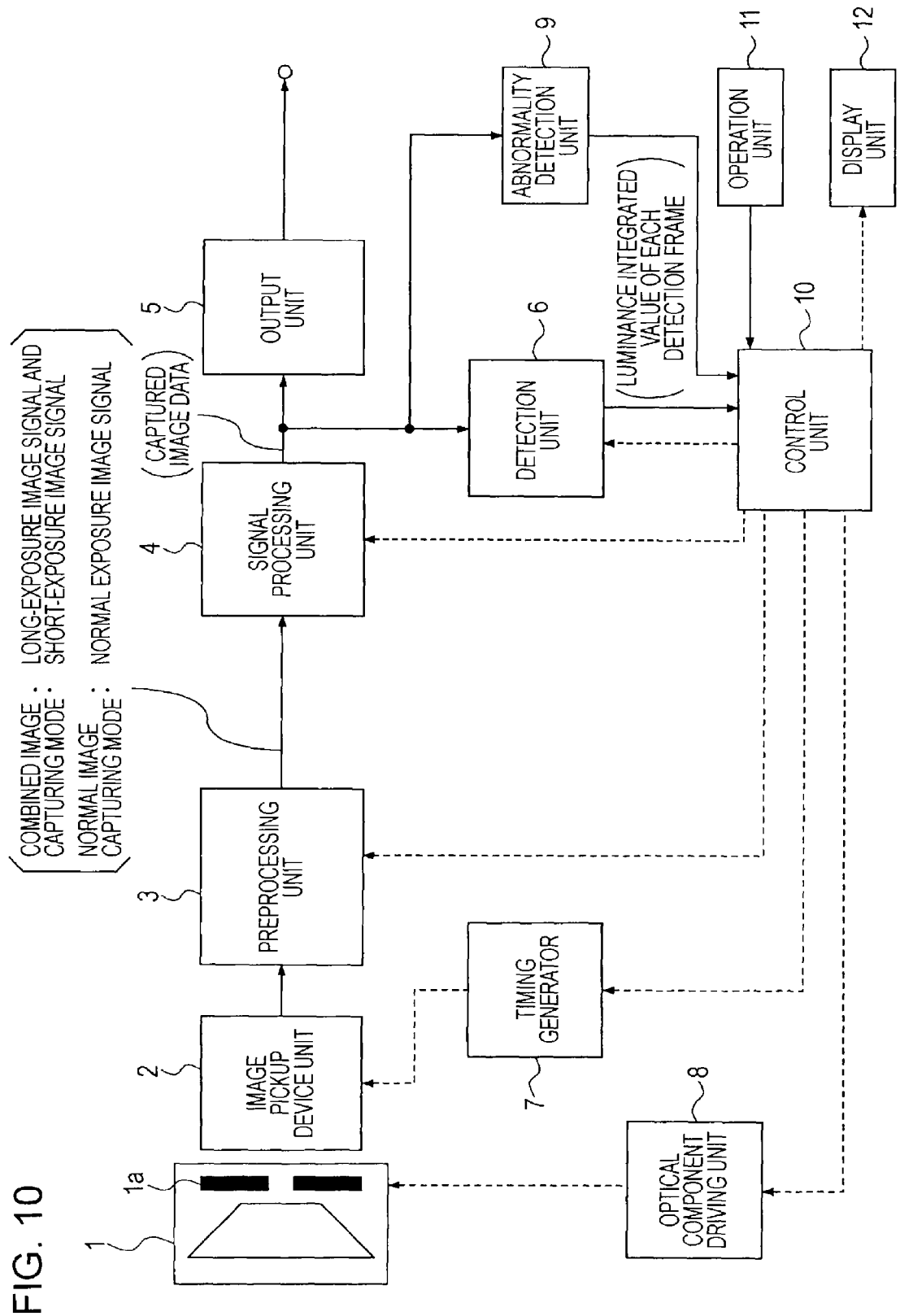
FIG. 10 is a block diagram illustrating a configuration of an image capturing apparatus for performing an exemplary process III according to an embodiment of the present invention.

FIG. 10 illustrates a configuration of an image capturing apparatus that performs the exemplary process III. An image capturing apparatus illustrated in FIG. 10 includes an abnormality detection unit 9 in addition to the components illustrated in FIG. 1. The abnormality detection unit 9 receives captured image data from the signal processing unit 4, performs motion detection upon the captured image data, and detects a particular part of an image capturing area where an abnormality has occurred. The motion detection methods include a method of specifying in advance some detection frames in the image capturing area AR and detecting whether a luminance level has been changed in each of the detection frames, a method of determining an area where motion has occurred by performing an image analysis or a frame comparison without specifying detection frames, and a method of detecting an image of a person and determining the occurrence of an abnormal condition using the movement speed of the detected image. Upon determining that an abnormal condition (for example, the existence of an intruder) has occurred using the above-described motion detection method, the abnormality detection unit 9 transmits the detection result and information about an area in an image where the abnormal condition has occurred to the control unit 10.

Figure 11A:
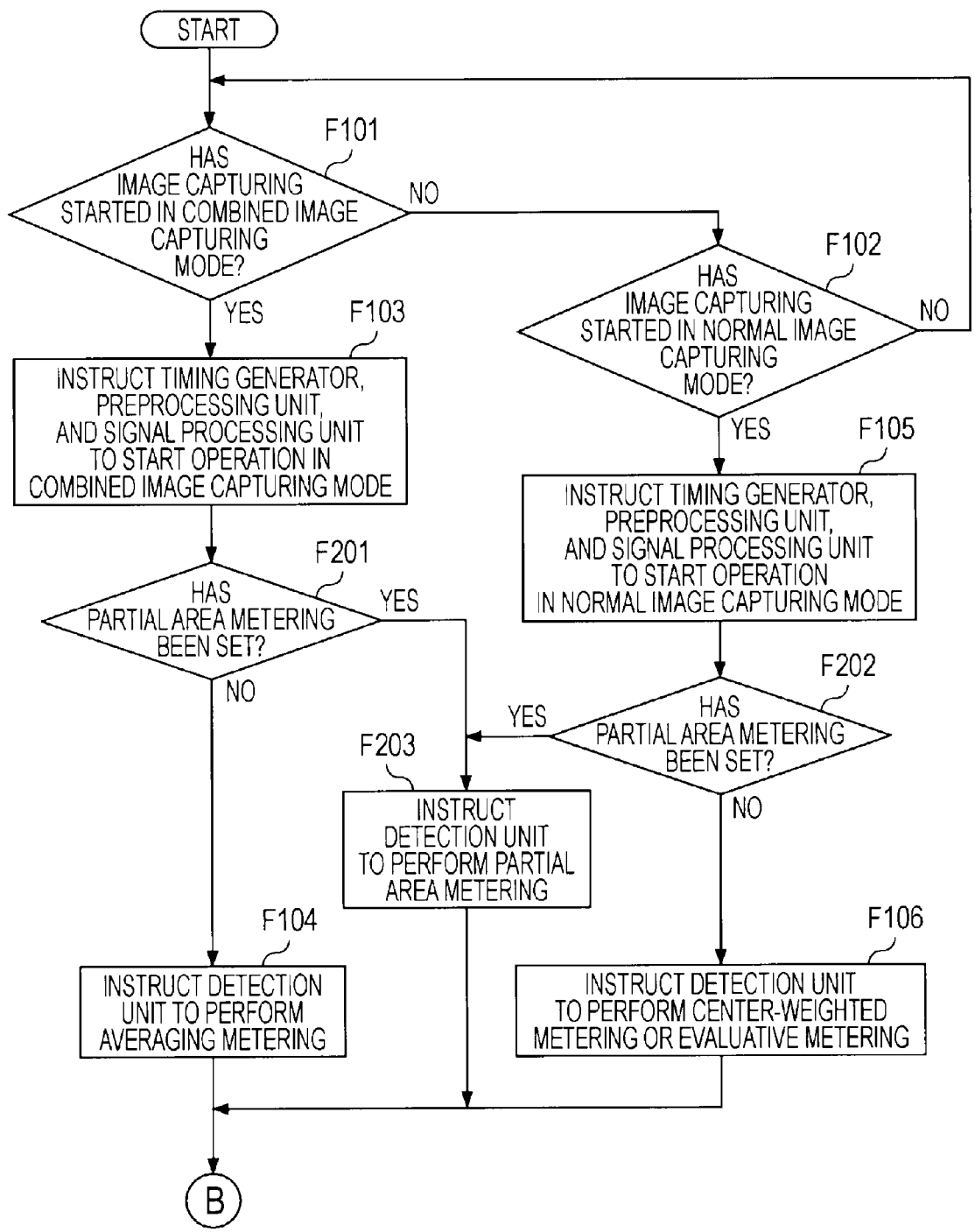
FIG. 11 is a flowchart illustrating the exemplary process III performed by a control unit according to an embodiment of the present invention.
Figure 11B:
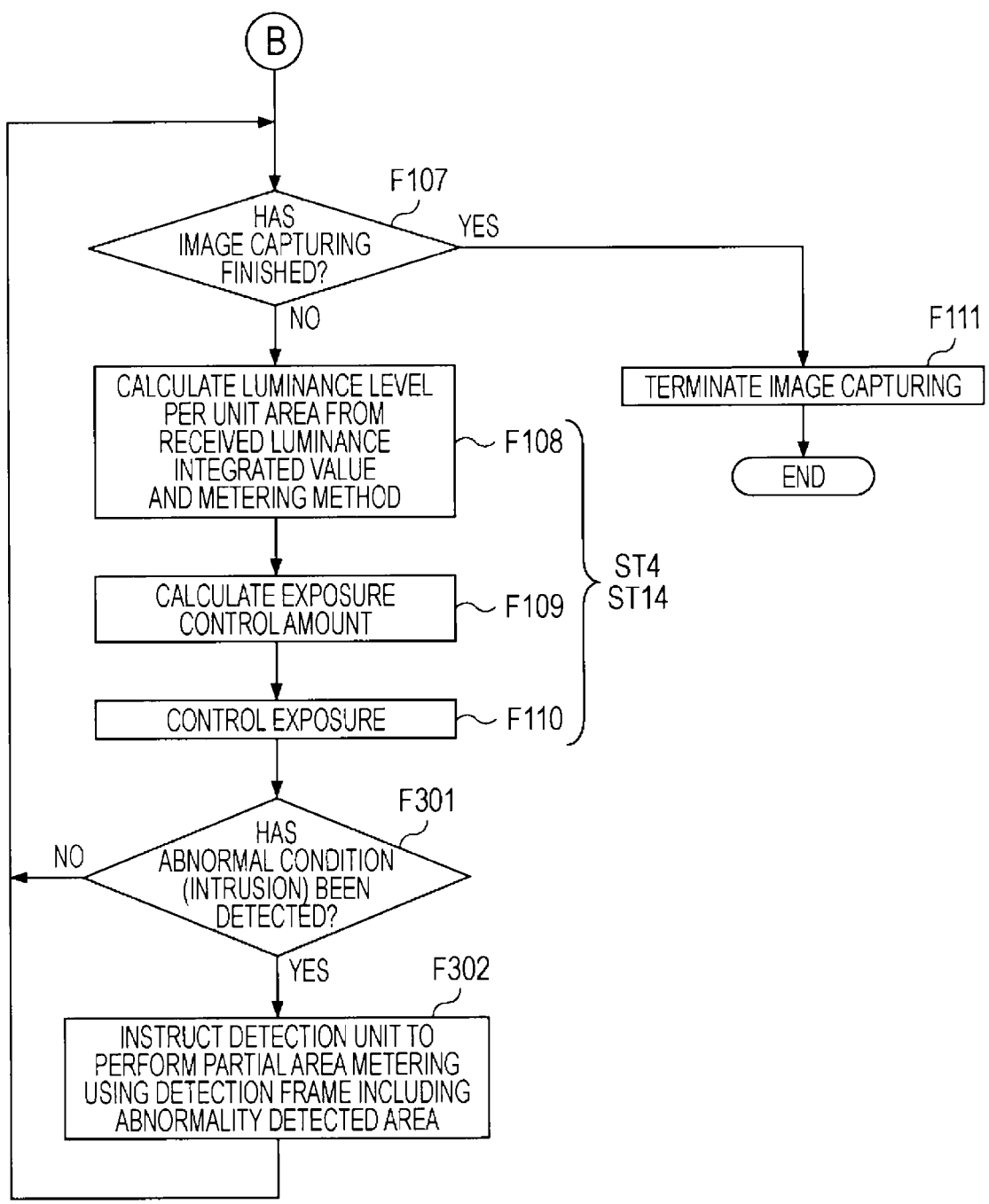

FIG. 11 illustrates an exemplary process performed by the control unit 10 included in an image capturing apparatus provided with the abnormality detection unit 9. Referring to FIG. 11, the processing operations of steps F101 to F111 have already been described with reference to FIG. 8, and the processing operations of steps F201, F202, and F203 have already been described with reference to FIG. 9. That is, this process illustrated in FIG. 11 is obtained by adding the processing operations of steps F301 and F302 to the process illustrated in FIG. 9.

Like the process illustrated in FIG. 9, in this process illustrated in FIG. 11, light metering is basically performed in the detection unit 6 using the center-weighted metering method or the evaluative metering method when the normal image capturing mode is set or using the averaging light metering method when the combined image capturing mode is set, and light metering is performed in the detection unit 6 using the partial area metering method when a user instructs the use of the partial area metering method. After an image capturing process has been started in the combined image capturing mode or the normal image capturing mode, the exposure control process is performed in steps F108, F109, and F110. At that time, the control unit 10 determines in step F301 whether an abnormality detection signal has been transmitted from the abnormality detection unit 9. If it is determined in step F301 that the abnormality detection signal has not been transmitted, the control unit 10 repeats the exposure control process on a field-by-field basis. If it is determined in step F301 that the abnormality detection signal has been transmitted, the process proceeds from step F301 to step F302 in which the control unit 10 instructs the detection unit 6 to use the partial area metering method and set an abnormality detected area on an image as a detection frame. Upon receiving the instruction from the control unit 10, the detection unit 6 changes a light metering method to the partial area metering method that is performed at the time of occurrence of an abnormal condition. That is, the detection unit 6 receives information about the abnormality detected area from the abnormality detection unit 9, sets the abnormality detected area as the detection frame W1, performs partial area light metering upon the detection frame W1, and supplies a luminance integrated value of the detection frame W1 to the control unit 10.

Subsequently, the control unit 10 performs the exposure control process from step F108 to step F110. More specifically, the control unit 10 calculates in step F108 a luminance level per unit area from the luminance integrated value of the detection frame W1 that has been set in the partial area metering method, and performs exposure control in steps F109 and F110.

According to the exemplary process III, light metering is basically performed in the detection unit 6 using the center-weighted metering method or the evaluative metering method when the normal image capturing mode is set or using the averaging light metering method when the combined image capturing mode is set, and light metering is performed in the detection unit 6 using the partial area metering method when a user instructs the use of the partial area metering method. Furthermore, at the time of occurrence of an abnormal condition in an image, an area where the abnormal condition has occurred is set as a detection frame, and light metering is performed upon the detection frame using the partial area metering method. Consequently, appropriate exposure control is performed upon the area where the abnormal condition has occurred. FIG. 10 illustrates an example in which the abnormality detection unit 9 is included in an image capturing apparatus. However, another example can be considered in which an external abnormality detection apparatus (for example, an image analysis apparatus) receives the captured image data and transmits an abnormality detection signal and information about an abnormality detected area to the control unit 10. If it is determined in step F301 that an abnormal condition has occurred, the control unit 10 may cause the display unit 2 to display a message for a user. For example, a message saying "An abnormality has been detected. Will the partial area metering be performed?" may be displayed and the partial area metering method may be set in accordance with a user's instruction. In the above description, the process illustrated in FIG. 11 is obtained by adding processing operations of steps F301 and F302 to the exemplary process illustrated in FIG. 9. However, it may be obtained by adding processing operations of steps F301 and F302 to the exemplary process illustrated in FIG. 8.

7. Advantage of Embodiment and Program

In the above-described embodiments, different light metering methods are used in the normal image capturing mode and the combined image capturing mode used for achievement of a wide dynamic range. Accordingly, appropriate light metering can be performed in each of these modes. In particular, it is desirable that the center-weighted metering method or the evaluative metering method be used in the normal image capturing mode, and the averaging metering method be used in the combined image capturing mode. By performing exposure control on the basis of a result of such appropriate light metering, automatic exposure performance can be improved in the combined image capturing mode without reducing quality of an image with a narrow wide dynamic range which is obtained in the normal image capturing mode. In the exemplary process II illustrated in FIG. 9, the partial area metering is performed in accordance with a user's instruction. Accordingly, exposure control can be performed upon a particular part of an image. In the exemplary process III illustrated in FIG. 11, an area where an abnormal condition has occurred is set as a detection frame, and the partial area metering is performed upon the detection frame. Accordingly, exposure control can also be performed upon the area where the abnormal condition has occurred.

An embodiment of the present invention can be applied to a camera system for capturing a moving image. However, an embodiment of the present invention may be applied to a camera system for capturing a still image. Even in the case of image capturing of a still image, during monitoring before image capturing is performed, a light metering method may be changed in accordance with an image capturing mode and exposure control may be performed on the basis of a result of light metering.

A program according to an embodiment of the present invention is a program corresponding to the processing performed by the control unit 10. That is, a program according to an embodiment of the present invention is a program causing the control unit 10 that is a microcomputer (processor) to perform various exemplary processes illustrated in FIGS. 8, 9, and 11. Such a program can be recorded in advance in an HDD that is a recording medium included in, for example, a personal computer or an image capturing apparatus, or a ROM or flash memory included in a microcomputer having a CPU. Alternatively, the program may be temporarily or permanently stored (recorded) on a removal recording medium such as a flexible disk, a CD-ROM (Compact Disc-Read-Only Memory), an MO (Magneto-Optical) disk, a DVD (Digital Versatile Disc), a blue-ray disc, a magnetic disk, a semiconductor memory, or a memory card. Such a removable recording medium may be obtained as package software. A program according to an embodiment of the present invention may be installed from the removable recording medium on a personal computer, or may be transferred from a download site to the personal computer via a network such as a LAN (Local Area Network) or the Internet.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing apparatus comprising:
   an image capturing processing unit configured to selectively perform
      a normal image capturing process in a normal image capturing mode to obtain a single exposure image signal and to generate captured image data by performing signal processing upon the single exposure image signal, and
      a combined image capturing process in a combined image capturing mode to obtain a long-exposure image signal by exposure for a long period and a short-exposure image signal by exposure for a short period and to generate captured image data by performing signal processing including signal combination processing upon the long-exposure image signal and the short-exposure image signal, the long exposure period being longer than the short exposure period;
   a detection unit configured to perform one of center-weighted light metering, evaluative light metering, and averaging light metering on the captured image data generated by the image capturing processing unit; and
   a control unit configured to cause the detection unit to perform one of center-weighted light metering and evaluative light metering when the image capturing processing unit is in the normal image capturing mode and to perform averaging light metering when the image capturing processing unit is in the combined image capturing mode.

2. The image capturing apparatus according to claim 1, wherein the control unit performs exposure control for the image capturing processing unit on the basis of a result of the light metering performed by the detection unit.

3. The image capturing apparatus according to claim 1, wherein, when an instruction for the use of a partial area metering method is received during performance of the normal image capturing process in the normal image capturing mode or performance of the combined image capturing process in the combined image capturing mode, the control unit causes the detection unit to use a partial area light metering method.

4. The image capturing apparatus according to claim 1, wherein, when an abnormal condition is detected during performance of the normal image capturing process in the normal image capturing mode or performance of the combined image capturing process in the combined image capturing mode, the control unit causes the detection unit to use a partial area metering method.

5. The image capturing apparatus according to claim 1, wherein the detection unit divides the captured image data into detection frames according to the light metering method selected by the control unit, and outputs to the control unit a luminance integrated value for each frame.

6. The image capturing apparatus according to claim 1, wherein the control unit receives from the detection unit luminance integrated values for detection frames corresponding to the selected light metering method, calculates an average luminance level per unit area of the captured image data, calculates a difference between the average luminance level per unit area of the captured image data and a target average luminance level per unit area, and performs exposure control based on the calculated difference.

7. The image capturing apparatus according to claim 1, wherein the detection unit performs averaging light metering by selecting the entire captured image data as a single detection frame, calculating a luminance integrated value of the detection frame, and outputting the calculated luminance integrated value to the control unit.

8. A light metering method for an image capturing apparatus including an image capturing processing unit configured to selectively perform a normal image capturing process in a normal image capturing mode to obtain a single exposure image signal to generate captured image data by performing signal processing upon the single exposure image signal, and a combined image capturing process in a combined image capturing mode to obtain a long-exposure image signal by exposure for a long period and a short-exposure image signal by exposure for a short period shorter than the long period and to generate captured image data by performing signal processing including signal combination processing upon the long-exposure image signal and the short-exposure image signal, the light metering method comprising:
   selecting one of center-weighted light metering and evaluative light metering to be performed on the captured image data generated by the image capturing processing unit when the image capturing processing unit is in the normal image capturing mode; and
   selecting averaging light metering to be performed on the captured image data generated by the image capturing processing unit when the image capturing processing unit is in the combined image capturing mode.

9. A luminance calculation method for an image capturing apparatus that includes,
   an image capturing processing unit configured to selectively perform a normal image capturing process in a normal image capturing mode to obtain a single exposure image signal and to generate captured image data by performing signal processing upon the single exposure image signal, and a combined image capturing process in a combined image capturing mode to obtain a long-exposure image signal by exposure for a long period and a short-exposure image signal by exposure for a short period shorter than the long period and to generate captured image data by performing signal processing including signal combination processing upon the long-exposure image signal and the short-exposure image signal, and a detection unit configured to perform one of center-weighted light metering, evaluative light metering, or averaging light metering on the captured image data generated by the image capturing processing unit, the luminance calculation method comprising:

selecting one of center-weighted light metering and evaluative light metering to be performed by the detection unit when the image capturing processing unit is in the normal image capturing mode;

selecting averaging light metering to be performed by the detection unit when the image capturing processing unit is in the combined image capturing mode;

receiving a value obtained by light metering performed by the detection unit; and performing computation using the received value based on the light metering method performed in the detection unit to calculate a luminance value per unit area of the captured image data.

10. A non-transitory computer readable storage medium storing computer readable instructions thereon which, when executed by a computer, cause the computer to perform a luminance calculation method for an image capturing apparatus that includes, an image capturing processing unit configured to selectively perform a normal image capturing process in a normal image capturing mode to obtain a single exposure image signal and to generate captured image data by performing signal processing upon the single exposure image signal, and a combined image capturing process in a combined image capturing mode to obtain a long-exposure image signal by exposure for a long period and a short-exposure image signal by exposure for a short period shorter than the long period and to generate captured image data by performing signal processing including signal combination processing upon the long-exposure image signal and the short-exposure image signal, and a detection unit configured to perform one of center-weighted light metering, evaluative light metering, and averaging light metering on the captured image data generated by the image capturing processing unit, the luminance calculation method comprising:

selecting one of center-weighted light metering and evaluative light metering to be performed by the detection unit when the image capturing processing unit is in the normal image capturing mode; and selecting averaging light metering to be performed by the detection unit when the image capturing processing unit is in the combined image capturing mode;

receiving a value obtained by light metering performed by the detection unit; and performing computation using the received value based on the light metering method performed in the detection unit to calculate a luminance value per unit area of the captured image data.

* * * * *